(12) United States Patent
Reyes

(10) Patent No.: US 11,895,280 B2
(45) Date of Patent: Feb. 6, 2024

(54) FORECASTING AND REPORTING AVAILABILITY OF MULTI-FUNCTIONAL PERIPHERAL DEVICES

(71) Applicant: Alex Reyes, Saratoga, CA (US)

(72) Inventor: Alex Reyes, Saratoga, CA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/178,142

(22) Filed: Feb. 17, 2021

(65) Prior Publication Data
US 2022/0263971 A1 Aug. 18, 2022

(51) Int. Cl.
 H04N 1/00 (2006.01)
 H04N 1/32 (2006.01)
 G06N 3/04 (2023.01)
 G06N 3/08 (2023.01)
(52) U.S. Cl.
 CPC .......... *H04N 1/32539* (2013.01); *G06N 3/04* (2013.01); *G06N 3/08* (2013.01); *H04N 1/00408* (2013.01); *H04N 2201/0094* (2013.01)
(58) Field of Classification Search
 CPC .................................................. H04N 1/32539
 See application file for complete search history.

(56) References Cited

U.S. PATENT DOCUMENTS

| 10,025,544 B1* | 7/2018 | Brahma | H04N 1/00954 |
| 2003/0214657 A1* | 11/2003 | Stringham | H04L 69/329 |
| | | | 358/1.15 |
| 2010/0020349 A1* | 1/2010 | Carroll | G06F 3/1219 |
| | | | 358/1.15 |
| 2015/0070725 A1* | 3/2015 | Monden | G06F 3/1292 |
| | | | 358/1.15 |
| 2016/0219189 A1* | 7/2016 | Kitazaki | H04N 1/00244 |
| 2017/0208181 A1* | 7/2017 | Kim | H04N 1/0023 |
| 2020/0311635 A1* | 10/2020 | Emig | G06Q 10/1095 |

* cited by examiner

Primary Examiner — Benjamin O Dulaney
(74) Attorney, Agent, or Firm — Hickman Becker Bingham Ledesma LLP

(57) ABSTRACT

An approach is provided for forecasting and reporting availability of multi-functional peripheral (MFP) devices. Availability data of MFP devices may be determined from historical usage data of the MFP devices, pending print job data of the MFP devices, current print job data of the MFP devices, operational data of the MFP devices, and/or a combination thereof. The availability data may be displayed on client computing devices to assists users to intelligently request print jobs.

18 Claims, 4 Drawing Sheets

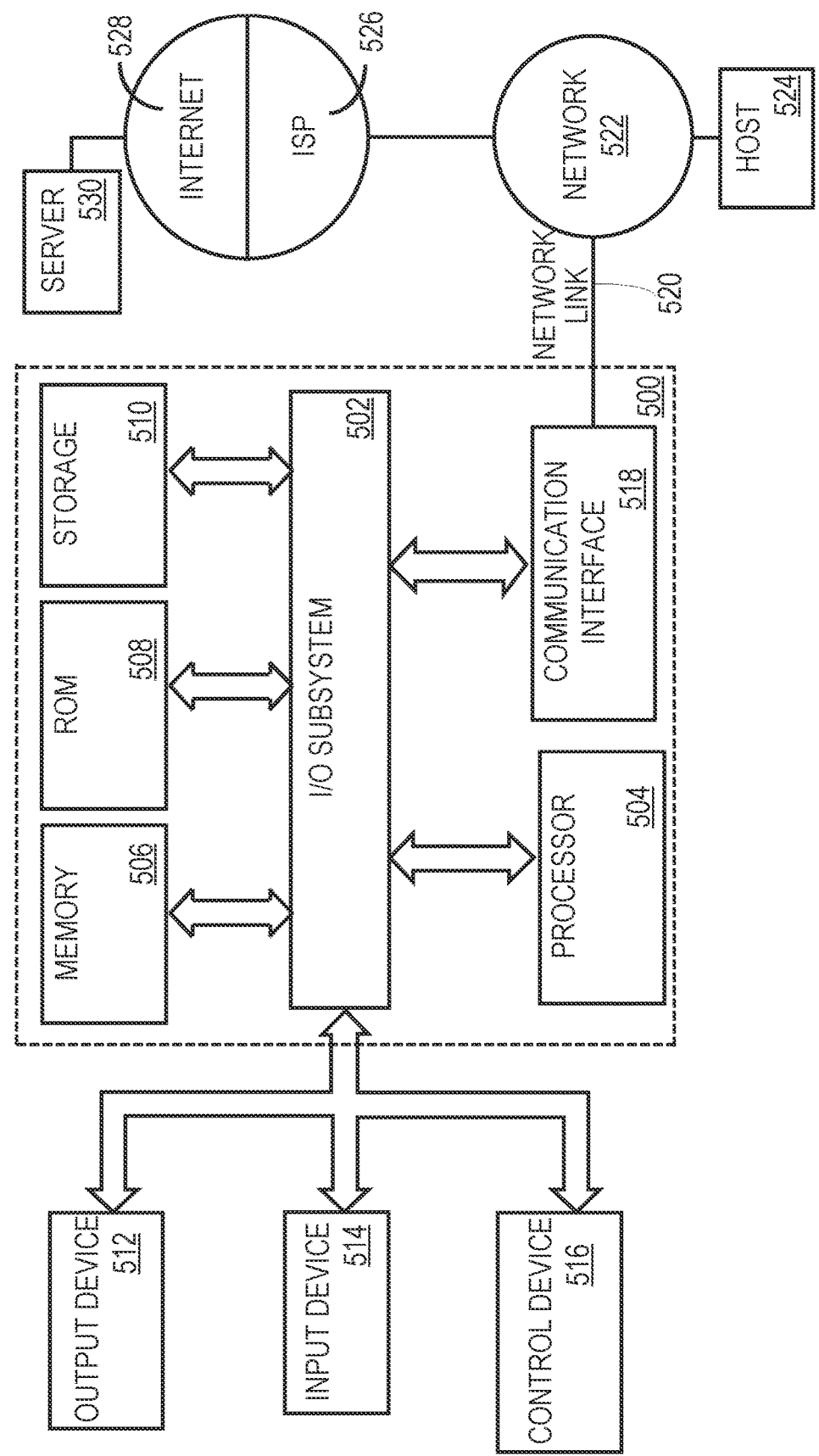

FORECASTING AND REPORTING AVAILABILITY OF MULTI-FUNCTIONAL PERIPHERAL DEVICES

FIELD

The present application relates generally to multi-functional peripherals and, more specifically, to forecasting and reporting availability of multi-functional peripheral devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Multi-functional peripherals (MFPs) are devices that employ multiple functions, such as copying, scanning, printing, faxing, or a combination thereof. An MFP may be shared by numerous people. As users do not have visibility as to whether MFPs are available for use, a user may submit a print job to an MFP that is currently processing a print job. Depending on the urgency of the user, the user may cancel their print job and select another MFP that may be even busier than the previously selected MFP, or the user may wait by the MFP for their print job to complete, not knowing that a current print job will not be completed soon. Waiting for a print job, especially small one, to complete can be a time-wasting and frustrating ordeal. Lack of such visibility results in inefficient use of network resources that would be required in rescheduling print jobs.

SUMMARY

The appended claims may serve as a summary. In one aspect, a method is provided. The method comprises determining, based on metrics associated with one or more multi-function peripheral (MFP) devices, availability data of at least one MFP device from the one or more MFP devices that is located within a specified range of a mobile device; wherein the availability data includes a time range in which the at least one MFP device from the one or more MFP devices is available for use; causing to display on the mobile device the availability data.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

In the figures of the accompanying drawings like reference numerals refer to similar elements.

FIG. 5 is a block diagram of a computer system on which embodiments may be implemented.

DETAILED DESCRIPTION

In the following description, for the purposes of explanation, numerous specific details are set forth in order to provide a thorough understanding of the embodiments. It will be apparent, however, to one skilled in the art that embodiments may be practiced without these specific details. In other instances, well-known structures and devices are shown in block diagram form in order to avoid unnecessarily obscuring the embodiments. Various embodiments are described hereinafter in the following sections:

I. OVERVIEW
II. ARCHITECTURE OVERVIEW
  A. NETWORK
  B. MFP SERVER COMPUTER
  C. MFP DEVICES
  D. CLIENT COMPUTING DEVICES
  E. DATA REPOSITORY
  F. PROCESSING SERVER COMPUTER
III. PROCEDURAL OVERVIEW
IV. IMPLEMENTATION EXAMPLES

I. Overview

According to various embodiments, computer-implemented apparatuses, methods, and systems are provided for forecasting and reporting availability of multi-functional peripheral (MFP) devices. Availability data of MFP devices may be determined from historical usage data of the MFP devices, pending print job data of the MFP devices, current print job data of the MFP devices, operational data of the MFP devices, and/or any combination thereof. The availability data may be displayed on client computing devices upon request or when the client computing devices are within proximity of the MFP devices. This approach provides forecasted available usage times that assists users to intelligently request print jobs, and minimize waiting and rescheduling time.

Technical benefits include improved performance and responsiveness of MFP devices by directing users to available MFP devices. This decreases consumption of network bandwidth and processing resources, such as CPU usage, and memory that the client computing systems of users would waste on rescheduling.

II. Architecture Overview

Figure 1:
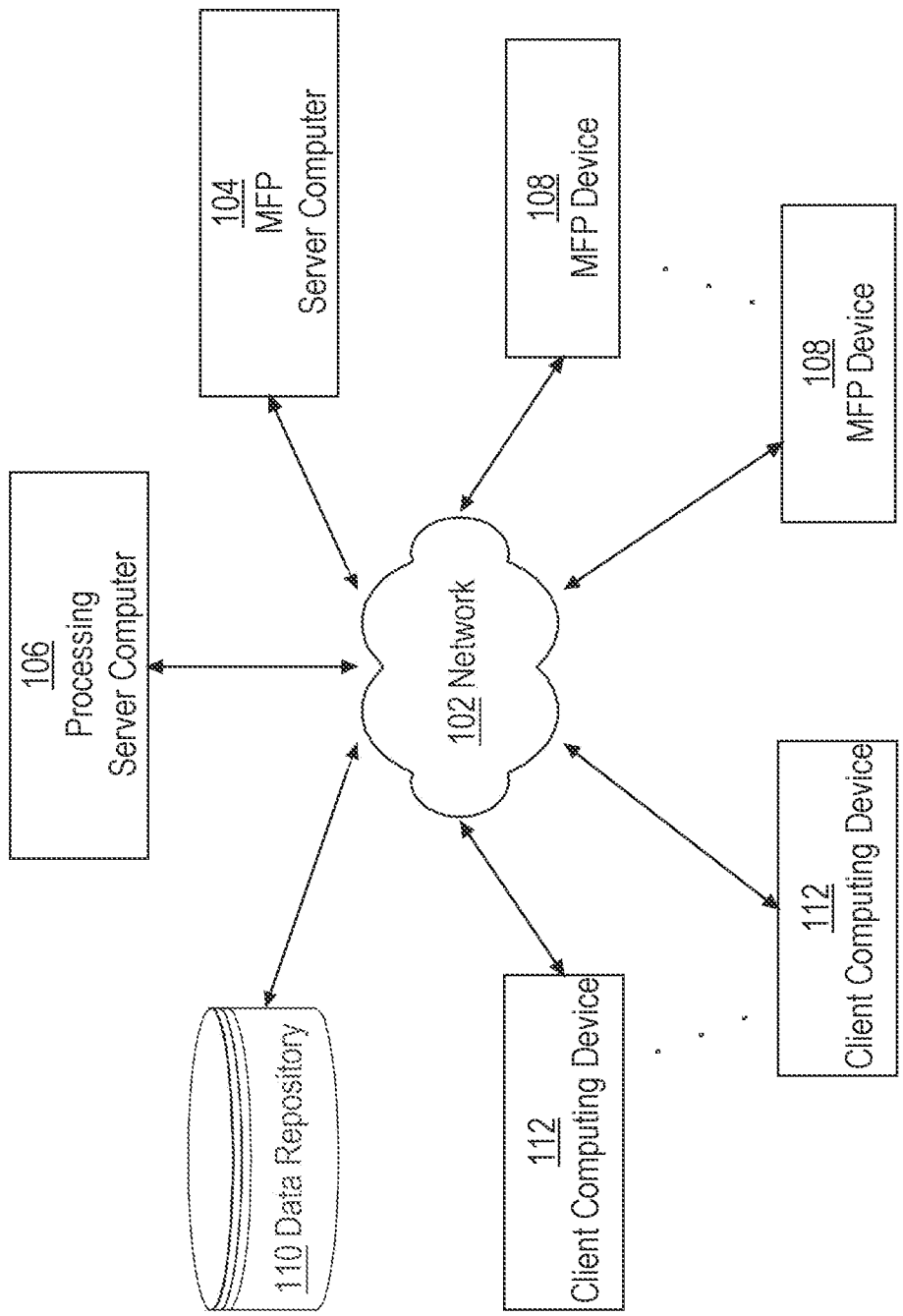
FIG. 1 depicts a networked computer system, according to an embodiment.

FIG. 1 depicts a networked computer system 100, according to an embodiment. In an embodiment, the computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" or "computing device" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or "a computing device" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C, or any other suitable programming environment.

FIG. 1 depicts only one of many possible arrangements of components configured to execute the programming described herein. Other arrangements may include fewer or different components, and the division of work between the components may vary depending on the arrangement. In the example of FIG. 1, the networked computer system 100 includes a multi-functional peripheral (MFP) server computer 104, a processing server computer 106, a plurality of MFP devices 108 (individually and collectively), a data repository 110, and one or more client computing devices 112 (individually and collectively), all of which are communicatively coupled via a network 102.

Although the components of FIG. 1 are depicted and described herein in one particular configuration, this is done for explanation purposes only and the components of FIG. 1 may be configured in any manner. For example, the MFP server computer 104 and the processing server computer 106 may each represent two or more separate data server computers, communicatively coupled via a network. For another example, the MFP server computer 104 and the processing server computer 106 may be the same data server computer.

A. Network

Network 102 broadly represents a combination of one or more local area networks (LANs), wide area networks (WANs), metropolitan area networks (MANs), global interconnected internetworks, such as the public internet, or a combination thereof. Each such network may use or execute stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All components described herein may be configured to connect to the network 102 and the disclosure presumes that all components of FIG. 1 are communicatively coupled via network 102. The various components depicted in FIG. 1 may also communicate with each other via direct communications links that are not depicted in FIG. 1 for purposes of explanation.

B. MFP Server Computer

An MFP server computer 104 may be a system configured as an interface between the MFP devices 108 and users, such as users of client computing devices 112. The MFP server computer 104 may manage authentication of users prior to operation of the MFP devices 108.

C. MFP Devices

An MFP device 108 is a device that performs one or more functions, such as copying, scanning, printing, faxing, or a combination thereof. Example implementations of MFP devices 108 include, without limitation, small office or home office printers, larger commercial copy printers, portable multi-function print devices, or any other print device that is capable to communicating to the MFP server computer 104 using a network connection. In an embodiment, the MFP devices 108 are equipped with a graphical user interface screen that allow users to enter commands and credential information prior to operating the MFP devices 108.

Each MFP device 108 includes a computing architecture that includes processor and storage. Storage may be implemented by volatile storage, non-volatile storage, or any combination of volatile and non-volatile storage. Each MFP device 108 may be configured to locally store a print queue and one or more logs in storage.

In an embodiment, a print queue maintains pending print jobs for a corresponding MFP device 108. The pending print jobs are print jobs that are scheduled to be completed at that MFP device 108. Pending print job data in the print queue may be accessible by one or more server computers, such as the MFP server computer 104 and/or the processing server 114, for further processing. In an embodiment, the print queue may be stored by the MFP server computer 104.

In an embodiment, the MFP device 108 stores at least one function log and one operating log. A function log may be a dedicated log for a specific function of the MFP device 108, such as copy, scan, print, or fax. For example, a print job log may be for the print function of the MFP device 108 to record print jobs. Alternatively, a single function log may be used for all functions of the MFP device 108 to record jobs of all types.

The operating log may be a dedicated log that records operational activities occurring at or on the MFP device 108, such as if and/or when a user is currently authenticated at the MFP device 108, if and/or when a part of the MFP device 108 is in use (e.g., graphical user interface screen is activated), if and/or when the MFP device 108 is being serviced, and/or other operational activity. Each operational activity may be associated with an operational code. For example, the operational code for when the graphical user interface screen is activated may be PANEL_ON.

Each log includes an entry for each event that has occurred or is occurring at a corresponding MFP device 108. Each entry includes a plurality of parameters that describes a corresponding event. For example, parameters of an entry in a print job log may indicate a timestamp, document owner, document name, size of document, total pages, and/or other information related to a print job event. For another example, parameters of an entry in an operating log may indicate a timestamp, operational activity code, and/or other information related to an operational activity. Logs may be accessible by one or more server computers, such as the MFP server computer 104 and/or the processing server 114, for further processing.

D. Client Computing Devices

A client computing device 112 may be implemented by any type of computing device. Example implementations of computing device 112 include, without limitation, workstations, personal computers, laptop computers, tablet computers, personal digital assistants (PDAs), cellular telephony devices and any type of mobile devices.

In an embodiment, the client computing devices 112 are equipped with one or more location sensors to determine locations of the client computing devices 112 based on location information using, for example, Global Positioning (GPS), cell phone towers, Wi-Fi access points, or a combination of these.

In an embodiment, the client computing devices 112 are configured with one or more applications that communicate information to and from components in the computer system 100.

For example, users may submit requests from the client computing devices 112, in which print requests are added to queues associated with the MFP devices 108. As an illustration, a user may submit a print job request for a particular MFP device 108 from a personal computer 112, in which that request is added to the print queue of that particular MFP device 108. In an embodiment, availability data of the MFP devices 108 may be provided to users before and/or during scheduling. Users may use availability data of the MFP devices 108 to intelligently schedule print jobs.

For example, users may receive notifications on the client computing devices 112 regarding availability of one or more MFP devices 108. As an illustration, a user may receive an alert or notification on a mobile device 112 information about the availability of certain MFP devices 108 that are closest to the mobile device 112 based on a current location of the mobile device 112.

Users may use client computing devices 112 to configure notification settings in their user accounts or profiles. For example, a user may define a range in which MFP devices 108 are within the user-defined range of the user (and, by extension, their client computing device 112) to receive information about. For another example, the user may also specify how information is to be presented (e.g., organized) on the client computing device 112.

E. Data Repository

A data repository 110 may include a historical usage database. As used herein, the term "database" refers to a corpus of data, organized or unorganized, in any format, with or without a particular interface for accessing the corpus of data. The historical usage database may include previously exported logs and other past usage data of the MFP devices 108. The historical usage database may include information such as how often and when the MFP devices 108 were used, and/or other usage related data.

F. Processing Server Computer

A processing server computer 106 may be a system configured to receive, process, and analyze data relating to the MFP devices 108, and/or provide information, alerts, or other notifications for the client computing devices 112. Although the processing server computer 106 is shown in FIG. 1 as a separate data server computer from the MFP server computer 104, the MFP server computer 104 and the processing server computer 106 may be the same data server computer.

Figure 2:
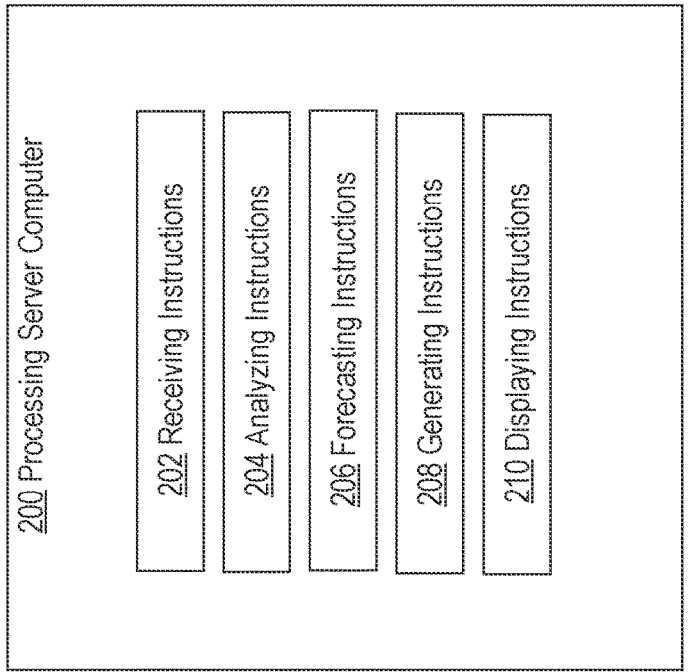
FIG. 2 depicts an analyzing server computer, according to an embodiment.

FIG. 2 is a block diagram that depicts an implementation of processing server computer 200, according to an embodiment. In an embodiment, the processing server computer 106 of FIG. 1 may be similarly configured as processing server computer 200. The processing server computer 200 may be programmed with receiving instructions 202, analyzing instructions 204, forecasting instructions 206, generating instructions 208, and displaying instructions 210.

The receiving instructions 202 may cause the processing server computer 200 to receive historical usage data from the data repository 110 of FIG. 1 and pending print job data and current logs (e.g., print job logs and operational logs) from the MFP devices 108 or the MFP server 104 of FIG. 1. The processing server computer 200 may access the data repository 110 as often new data is available at the data repository 110. The processing server computer 200 may access the MFP devices 108 periodically (e.g., every 3 hours, every hour, every half hour, every 20 minutes, every 10 minutes, etc.), as often as new data is available at the MFP devices 108, and/or as often as needed. The receiving instructions 202 may also cause the processing server computer 200 to receive location information of the client computing devices 112 of FIG. 1.

The analyzing instructions 204 may cause the processing server computer 200 to analyze the received data.

In an embodiment, the analyzing instructions 204 may be programmed to generate trend data from the historical usage data. The trend data indicates general unavailability or availability times of the MFP devices 108 based on past uses of the MFP devices 108.

In an embodiment, the analyzing instructions 204 may be programmed to use a neural network and/or a machine learning program or service, such as a classifier, that has been trained on usage data. In an embodiment, a labeled data set may be created or obtained. The labeled data set includes a variety of print jobs and corresponding labels. The neural network is trained using a framework, such as TensorFlow, with the labeled data, resulting in a trained model. The trained model may then be exported to and run on a computing device, such as the processing server computer 106. The analyzing instructions 204 may be programmed to apply the trained model to the pending print job data to predict unavailability times of the MFP devices 108.

In an embodiment, the analyzing instructions 204 may be programmed to parse the print job logs to extract the last entries from the print job logs. The last entries indicate whether there any print jobs currently being processed at the MFP devices 108. If there are print jobs in process, the analyzing instructions 204 may be programmed to determine current unavailability times of the MFP devices 108 (e.g., how much longer each print job will need for completion) based on parameters, such as timestamp, document size, etc., in a corresponding entry.

In an embodiment, the analyzing instructions 204 may be programmed to parse the operating logs to extract the last entries from the operating logs. The last entries indicate whether there any current activities at the MFP devices 108. A current activity at an MFP device 108 indicates that that MFP device 108 is currently being occupied or operated and is likely to be unavailable for some time.

In an embodiment, the analyzing instructions 204 may be programmed to determine a distance between a client computing device 112, such as a mobile device, and each MFP device 108, based on a current location of the client computing device 112. Distances may be determined upon a triggering event, such as when an availability request is submitted by the client computing device 112 (in which the current location of the client computing device 112 may be part of the availability request) or when the client computing device 112 is detected as being in proximity of an MFP device 108 (in which the current location of the client computing device 112 may be received in response to the detection).

The forecasting instructions 206 may cause the processing server computer 200 to forecast or determine availability data of the MFP devices 108, using metrics including calculated data relating to the general unavailability times of the MFP devices 108, calculated data relating to the predicted unavailability times of the MFP devices 108, calculated data relating to current unavailability times of the MFP devices 108, or a combination thereof. The availability data may be determined also based on operational data of the MFP devices 108.

In an embodiment, the availability data includes a time indication for each MFP device 108 in which the MFP device 108 is determined to be available for use within the next X amount of time, e.g., minutes, or hours, days, weeks, months, etc. The time indication may identify whether an MFP device 108 is currently available or is immediately available for use. The time indication may include a time range that may start from the current time or some time in the near future to a later time in the future. For example, the time range may indicate "MFP1 is available now," "MFP2 is available until 4:00 pm," or "MFP3 is available from 9:30 am to 10:15 am." The start time and end time are all within the next X amount of time.

In an embodiment, the availability data includes a location of each MFP device 108 (such as building number, floor number, area number, etc.). In an embodiment, the availability data includes a distance between a client computing device 112 and each MFP device 108, based on the current location of the client computing device 112.

The generating instructions 208 may cause the processing server computer 200 to generate alerts or notifications regarding forecasted availability times of at least a subset of the MFP devices 108. An alert or notification includes at least a portion of the availability data. For example, the alert or notification may include availability data for only those MFP devices 108 that are within a specified range (e.g., 200 feet) of a client computing device 112 or for the top, for example, five (5) closest MFP devices 108 to the client computing device 112. The specified range may be a default range or may be a user-defined range set by the user of the client computing device 112 as part of their notification settings. Similarly, a number of MFP devices returned may be set by the user of the client computing device 112 as part of their notification settings. The availability data may be organized based on distance, availability time, total availability time, and/or another arrangement defined by the user of the client computing device 112 as part of their notification settings.

The displaying instructions 210 may cause the processing server computer 200 to display alerts and notifications in a GUI on client computing devices 112.

III. Procedural Overview

According to one embodiment, an approach is provided for forecasting and reporting availability of MFP devices. The approach determines availability times of MFP devices using historical usage data, pending print job (queued) data, and current logs, and alerts or notifies users of the availability times of MFP devices.

Figure 3:
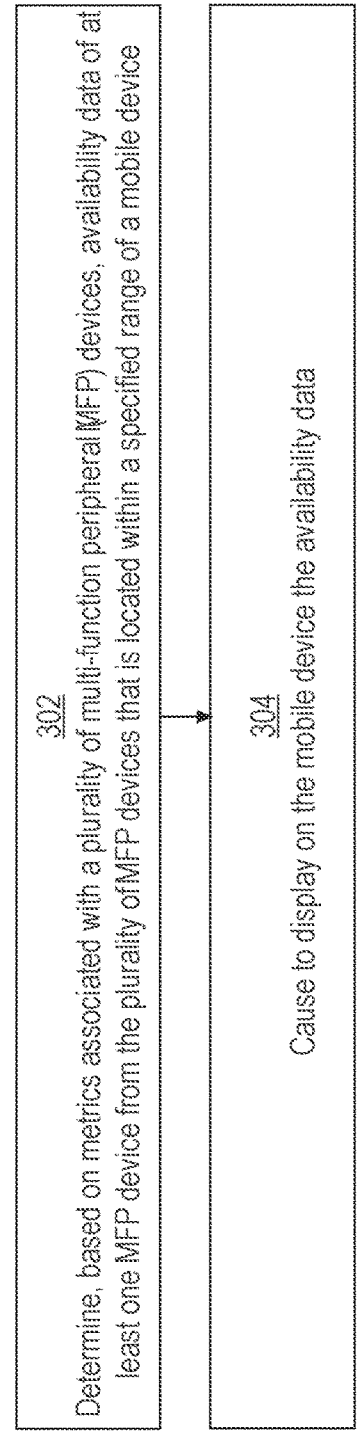
FIG. 3 is a method of forecasting and reporting available MFP device usage times, according to an embodiment.

FIG. 3 is a method 300 of forecasting and reporting available MFP device usage times, according to an embodiment. The method 300 is performed by one or more processes executing on a data server computer, such as the processing server computer 106 of FIG. 1.

In step 302, based on metrics associated with a plurality of MFP devices, the data server computer determines availability data of at least one MFP device from the plurality of MFP devices that is located within a specified range of a mobile device. The specified range may be a default range or may be a user-defined range set by the user of the mobile device as part of their notification settings.

The metrics may be determined from one or more of historical usage data, job logs, or queued data for the plurality of MFP devices. The data server computer may receive the historical usage data, the job logs, and the queued data from the plurality of MFP devices, a historical usage database, and/or other data server computers, such as an MFP server computer. The historical usage data describes past usage of the plurality of MFP devices. Each of the job logs describes current jobs on a particular MFP device from the plurality of MFP devices. The queued data describes pending jobs for the plurality of MFP devices.

In an embodiment, the availability data is determined also based on operational data received from the plurality of MFP devices. The operational data describes current operational activities at the plurality of MFP devices.

The availability data includes an identifier identifying the at least one MFP device from the plurality of MFP devices and a time range in which the at least one MFP device from the plurality of MFP devices is available for use. An example identifier is a name or an IP address of an MFP device. In an embodiment, the availability data may not include an identifier when the system has one MFP device. The time range may specify a start time and an end time of the availability time. The end time is a time in the future, and the start time is a current time or another time in the future that is earlier than the end time.

The availability data may also include a location of the at least one MFP device from the plurality of MFP devices.

The availability data may also include a distance between the at least one MFP device from the plurality of MFP devices and the mobile device based on a current location of the mobile device. The current location of the mobile device may be received as part of an availability request submitted from the mobile device, or may be received in response to detecting the mobile device being in proximity of the at least one MFP device from the plurality of MFP device.

In step 304, the data server computer causes the availability data to be displayed in a GUI on the mobile device. The availability data may be organized based on distance, availability time, total availability time, and/or another arrangement.

Figure 4A:
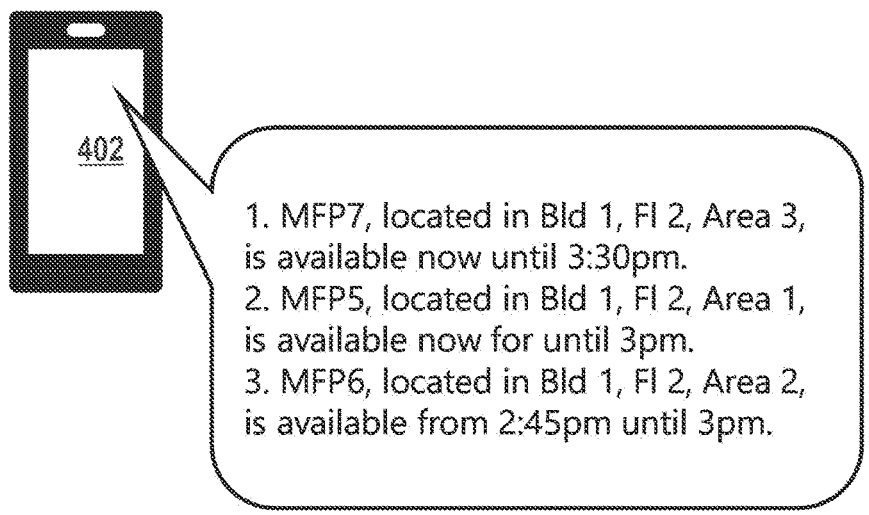
FIGS. 4A, 4B, 4C each depicts an example GUI showing availability data, according to an embodiment.
Figure 4B:
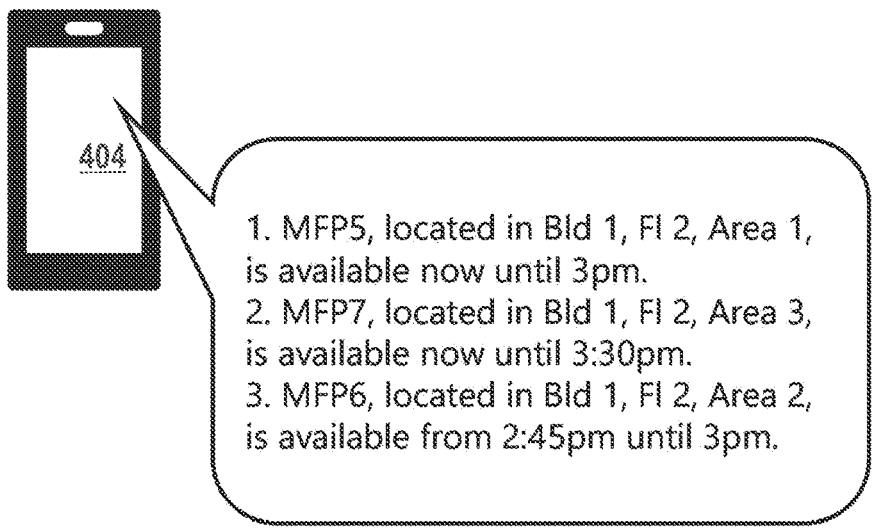
Figure 4C:
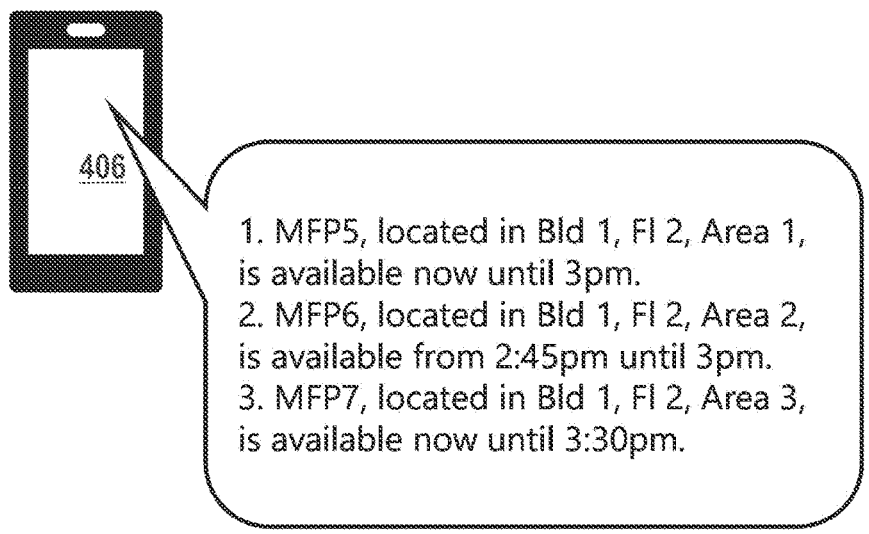

For illustrative purposes, assume the current time is 2:30 pm and three (3) MFP devices have been determined to be available within the next X amount of time, according to the techniques described above. Further assume that the user of the mobile device is currently in area 4 which is adjacent to area 1 and area 3 of building 1, floor 2. FIG. 4A depicts an example GUI 402 showing availability data that is organized based on distance from the mobile device. FIG. 4B depicts an example GUI 406 showing availability data that is organized based on availability time (e.g., most currently available). FIG. 4C depicts an example GUI 408 showing availability data organized based on total availability time. FIGS. 4A, 4B, 4C each represents only one brief example of how availability data is organized and presented, and other implementations and embodiments may be programmed or configured to present availability data in different ways, with different text, characters, of any length, and/or complexity. For example, when the system has only one MFP device, the availability data may simply include a time range (e.g., "The printer is available now until 3 pm.").

Techniques described herein notify or alert users of available time ranges of MFP devices, such as after availability requests are submitted by client computing devices or after client computing devices are detected as being in proximity of any one of the MFP devices. The availability information assists users to intelligently request print jobs, minimizing waiting and rescheduling time. The disclosed techniques herein can improve performance and responsiveness of MFP devices, and can result in use of fewer computational resources related to rescheduling, including less memory and fewer CPU cycles.

IV. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or Bluetooth technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A method comprising:
    determining, based on historical usage data for a plurality of multi-function peripheral (MFP) devices, availability data for two or more MFP devices, from the plurality of MFP devices, that are located within a specified range of a mobile device;
    wherein the availability data includes a time range with a start time and an end time during which each of the two or more MFP devices is available for use; and
    causing to display on the mobile device the availability data, according to an arrangement defined by a user of the mobile device in notification settings, the availability data for each given MFP device including the time range with the start time and the end time during which the given MFP device is available for use, wherein the arrangement defined by the user comprises organizing the availability data by total availability time.

2. The method of claim 1, wherein the availability data is further determined from one or more of job logs or queued data for the one or more MFP devices.

3. The method of claim 2, wherein the historical usage data describes past usage of the plurality of MFP devices, wherein each of the job logs describes current jobs on a particular MFP device from the plurality of MFP devices, and wherein the queued data describes pending jobs for the plurality of MFP devices.

4. The method of claim 1, wherein the availability data includes one or more of an identifier identifying the given MFP device, a distance between the given MFP device and the mobile device, or a location of the given MFP device.

5. The method of claim 1, wherein the availability data is determined also based on operational data of the plurality of MFP devices, wherein the operational data indicates whether each MFP device from the plurality of MFP devices is currently being operated.

6. The method of claim 1, wherein a current location of the mobile device is received as part of an availability request submitted from the mobile device.

7. The method of claim 1, wherein a current location of the mobile device is received in response to detecting the mobile device being in proximity of the two or more MFP devices.

8. The method of claim 1, wherein the time range specifies a start time and an end time, wherein the end time is a time in the future and the start time is a current time or another time in the future that is earlier than the end time.

9. An apparatus comprising:
    one or more processors; and
    one or more memories communicatively coupled to the one or more processors and storing instructions which, when processed by the one or more processors, cause:
        determining, based on historical usage data for a plurality of multi-function peripheral (MFP) devices, availability data for two or more MFP devices, from the plurality of MFP devices, that is located within a specified range of a mobile device;
        wherein the availability data includes a time range with a start time and an end time during which each of the two or more MFP devices is available for use; and causing to display on the mobile device the availability data, according to an arrangement defined by a user of the mobile device in notification settings, the availability data for each given MFP device including the time range with the start time and the end time during which the given MFP device is available for use, wherein the arrangement defined by the user comprises organizing the availability data by total availability time.

10. The apparatus of claim 9, wherein the availability data is further determined from one or more of job logs or queued data for the one or more MFP devices.

11. The apparatus of claim 10, wherein the historical usage data describes past usage of the plurality of MFP devices, wherein each of the job logs describes current jobs on a particular MFP device from the plurality of MFP devices, and wherein the queued data describes pending jobs for the plurality of MFP devices.

12. The apparatus of claim 9, wherein the availability data includes one or more of an identifier identifying the given MFP device, a distance between the given MFP device and the mobile device, or a location of the given MFP device.

13. The apparatus of claim 9, wherein the availability data is determined also based on operational data of the plurality of MFP devices, wherein the operational data indicates whether each MFP device from the plurality of MFP devices is currently being operated.

14. One or more non-transitory computer-readable media storing instructions which, when processed by one or more processors, cause:
   determining, based on historical usage data for a plurality of multi-function peripheral (MFP) devices, availability data for two or more MFP device from the plurality of MFP devices, that are located within a specified range of a mobile device;
   wherein the availability data includes a time range with a start time and an end time during which each of the two or more MFP devices is available for use; and
   causing to display on the mobile device the availability data, according to an arrangement defined by a user of the mobile device in notification settings, the availability data for each given MFP device including the time range with the start time and the end time during which the given MFP device is available for use, wherein the arrangement defined by the user comprises organizing the availability data by total availability time.

15. The one or more non-transitory computer-readable media of claim 14, wherein the availability data is further determined from one or more of job logs or queued data for the one or more MFP devices.

16. The one or more non-transitory computer-readable media of claim 15, wherein the historical usage data describes past usage of the plurality of MFP devices, wherein each of the job logs describes current jobs on a particular MFP device from the plurality of MFP devices, and wherein the queued data describes pending jobs for the plurality of MFP devices.

17. The one or more non-transitory computer-readable media of claim 14, wherein the availability data includes one or more of an identifier identifying the given MFP device, a distance between the given MFP device and the mobile device, or a location of the given MFP device.

18. The one or more non-transitory computer-readable media of claim 14, wherein the availability data is determined also based on operational data of the plurality of MFP devices, wherein the operational data indicates whether each MFP device from the plurality of MFP devices is currently being operated.

* * * * *